April 8, 1958 A. J. RADCLIFFE, JR., ET AL 2,830,128

CONDENSER-TIMED DELAYED SIGNAL REPEATER

Filed Dec. 21, 1954

United States Patent Office 2,830,128

Patented Apr. 8, 1958

2,830,128

CONDENSER-TIMED DELAYED SIGNAL REPEATER

Arthur J. Radcliffe, Jr., La Grange, and Arthur R. Denz, Chicago, Ill., assignors to International Telephone and Telegraph Corporation, New York, N. Y., a corporation of Maryland Application December 21, 1954, Serial No. 476,674

4 Claims. (Cl. 179—84)

This invention relates to a condenser-timed delayed signal repeater and more particularly to a signal repeater suitable for repeating signals arising from alternating-current transmission over a narrow frequency band forming part of a wider band such as a voice-frequency band. Its principal object is to provide an economical and satisfactory repeater of the foregoing character which is suitable for use with transistor amplifying apparatus following a frequency-discriminator type of A.-C. to D.-C. converter to repeat converter signals of only one polarity and to repeat no signal of a duration less than a predetermined interval (such as one second) while clipping the said predetermined interval from the first portion of any repeated signal. A further object is to provide a current-consuming circuit arrangement for detecting the voltage of the timing condenser without draining the condenser charge faster than it can accumulate.

Heretofore, it has been known to use a network including a timing condenser to measure the duration and polarity of the direct-current signals from the discriminator output, with a vacuum-tube direct-current amplifier to detect the voltage on the condenser and operate a relay when the signal of the required polarity and duration was received. In many situations, it is desirable to use transistors instead of vacuum tubes because of such advantages as reduced space and power requirements. But, a transistor direct-current amplifier is usually unsatisfactory because of output variations with temperature changes.

According to the invention, an alternating current transistor amplifier, which is less subject to output variations with temperature changes, is used to replace the direct-current amplifier. A diode gate is placed between an alternating-current source and the amplifier, and is arranged to pass alternating current or to block it according to the condenser voltage.

In the preferred form, when the input signals to the discriminator are within the signalling band, the discriminator output is of the one polarity and the condenser is slowly charged through a path including a high-resistance resistor. When the signals are not within the signalling band, the discriminator output is of the opposite polarity or is zero, and the condenser is rapidly discharged through a path including the low forward resistance of a diode shunting the resistor. Another diode in a path shunting the condenser prevents the condenser charging to the opposite polarity.

In the preferred form of the transistor amplifier, its output when alternating current is received contains a direct-current component which operates a relay.

Figure 1:
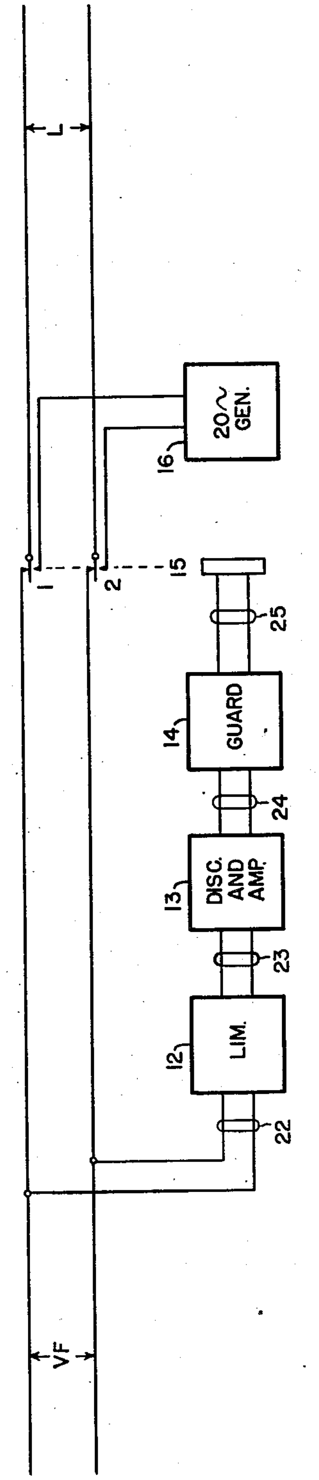
Figure 2:
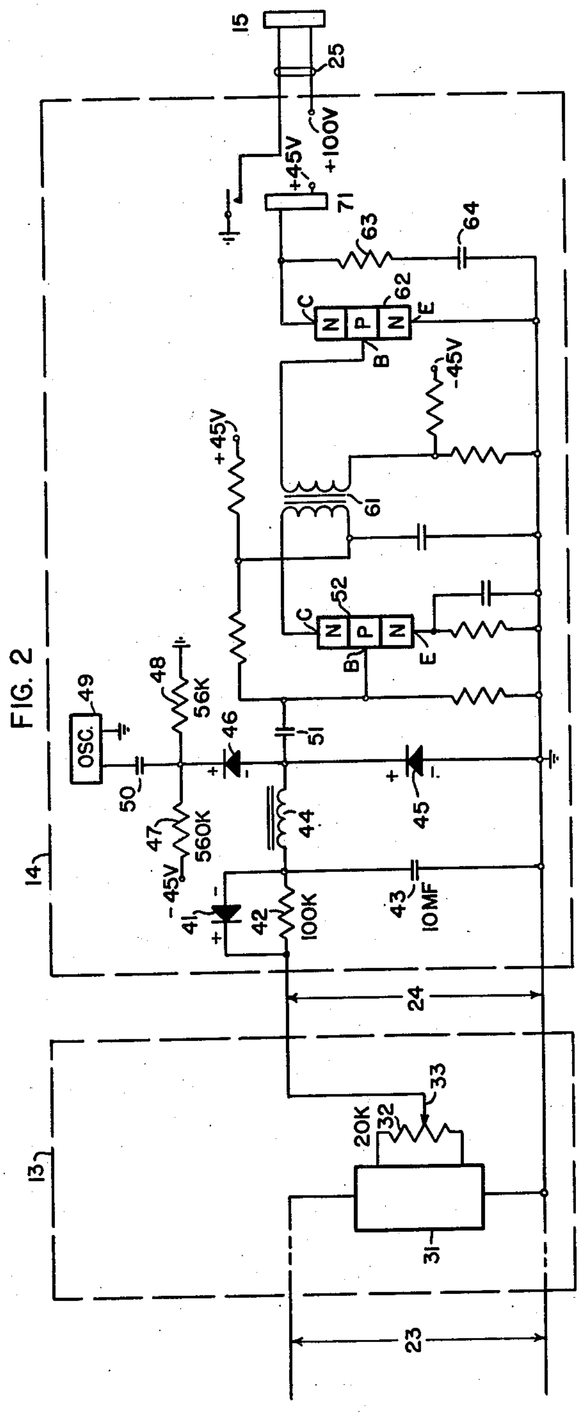

The foregoing and other objects and features of this invention and the manner of attaining them will become more apparent and the invention itself will be best understood, by reference to the following description of an embodiment of the invention taken in conjunction with the accompanying drawings comprising Figs. 1 and 2, wherein:

Fig. 1 shows a signal converter for repeating signals from a voice-frequency telephone or telegraph line to a local line; and Fig. 2 shows the guard circuit of the converter in circuit detail.

*Fig. 1.—General arrangement*

The signal converter shown in Fig. 1 illustrates one use of the invention.

A line VF, which will pass voice-frequencies but not low frequency signals, is shown connected through the back contacts of relay 15 to local line L, which will pass both voice frequencies and low frequency signals. Ringing and like signals received from line VF at a frequency within the voice frequency range, are connected by path 22 to limiter 12. They are then connected through path 23 to discriminator and amplifier 13, where they are converted to direct current according to frequency and are amplified. The direct current signals are then connected through path 24 to guard circuit 14. The guard circuit 14 prevents response to short bursts of signal at the ringing frequency. If the ringing signal persists for a short period, guard circuit 14 operates and closes a circuit through path 25 for relay 15. At the front contacts of relay 15, twenty cycle ringing current from generator 16 is connected to local line L.

*Fig. 2.—Guard circuit*

Referring to Fig. 2, the guard circuit 14 is shown in circuit detail, along with portions of the discriminator and amplifier 13, and the coil of the relay 15. The discriminator and amplifier 13 includes a direct current amplifier 31 with a resistor 32 across the output. Output signals are taken between ground and the slider 33 of resistor 32. When the input signals are within the ringing frequency band, output between slider 33 and ground is negative; at other frequencies the output is positive or zero. The output is connected by path 24 to guard circuit 14. Negative signals from the slider 33 charge the timing condenser 43 through resistor 42. When the potential to ground at slider 33 is positive or zero, condenser 43 discharges through the low forward resistance of diode 41 and through amplifier 31 to ground. If positive signals are received when condenser 43 is fully discharged, the current flows through coil 44 and diode 45 to ground, thereby preventing positive charge on the condenser 43.

A source of alternating current signals, oscillator 49, is coupled through condenser 50, diode 46, and condenser 51, to the input of transistor amplifier 52. The diode 46 is biased to approximately minus four volts by a tap to the voltage divider comprising resistors 47 and 48 connected between minus forty-five volts and ground. The alternating current potential is low compared to the bias potential and is normally blocked.

When a negative input signal lasts long enough to charge condenser 43 to the bias potential and establish a direct-current flow forward through diode 46, alternating current from oscillator 49 flows through condenser 50, diode 46, and condenser 51 to transistor 52. The choke coil 44 prevents the alternating current from flowing to the timing condenser 43 or the direct-current input circuit. The direct-current signals are blocked from the oscillator 49 by condenser 50, and from amplifier 52 by condenser 51.

The alternating current is amplified by amplifier 52 and coupled through transformer 61 to transistor 62. The transistor amplifier 62 is normally biased to cutoff with negligible current flowing. When a signal is received, transistor 62 conducts heavily with a half wave output, resulting in a net direct-current output. Resistor 63 and condenser 64 filter the output, and act as an arc suppressor for relay 71. Relay 71 operates and at its contacts closes a circuit for relay 15. Relay 15 operates from a positive 100-volt source, and, as shown in Fig. 1, at its contacts connects twenty-cycle ringing current from generator 16 to local line L.

While we have described above the principles of our invention in connection with specific apparatus, it is to be clearly understood that this description is made only by way of example and not as a limitation to the scope of our invention.

We claim:

1. In combination, a storage condenser, a signal source of variable potential direct current, path means responsive to a signal potential of one polarity from the signal source for charging the storage condenser through the signal source to a corresponding polarity, said path means discharging the condenser, if charged, through the signal source responsive to the signal potential of the said one polarity being either absent or less than the potential to which the condenser has been charged, a source of alternating-current, a signal device responsive to alternating current when received, a coupling path extending from the alternating-current source to the signal device by way of a gating diode, direct-current means normally biasing the diode inversely to a potential in excess of the potential of the alternating-current source, whereby alternating current flow through the diode is normally blocked, and circuit means responsive to the charging of said condenser to at least a given potential of the said one polarity for sending a direct current forwardly through the gating diode in opposition to the said direct-current biasing means to allow the diode to carry to the signal device alternating current superimposed on the direct current.

2. In a combination according to claim 1, the said path means for charging and discharging the said storage condenser including a path of relatively high resistance for charging the condenser and a path of lower resistance including a first charge-control diode shunted across the high-resistance portion of the path and directed for current flow in the forward direction during condenser discharge, and a path including a second charge-control diode shunted across the condenser for preventing the condenser from charging to a potential of polarity opposite to the said one polarity.

3. In a combination according to claim 1, choke-coil means for blocking the flow of current from the said source of alternating current to the said storage condenser and signal source, and condenser means for blocking flow of direct-current from the said signal source and storage condenser to the said signal device.

4. A combination according to claim 1, wherein the said signal device comprises an alternating current transistor amplifier followed by a direct-current relay, and means included in the amplifier for producing a direct-current component in its output for operating the relay.

References Cited in the file of this patent

UNITED STATES PATENTS 2,409,105 Christian _______________ Oct. 8, 1946